United States Patent [19]
Sims

[11] B 3,983,433
[45] Sept. 28, 1976

[54] WIRE STATOR CORE STRUCTURE AND METHOD OF MAKING SAME
[75] Inventor: Marion W. Sims, South Whitley, Ind.
[73] Assignee: General Electric Company, Fort Wayne, Ind.
[22] Filed: Nov. 5, 1974
[21] Appl. No.: 521,045
[44] Published under the second Trial Voluntary Protest Program on February 24, 1976 as document No. B 521,045.
[52] U.S. Cl. .............................. 310/254; 310/42; 310/216; 310/217; 310/218
[51] Int. Cl.² ...................... H02K 1/06; H02K 1/12
[58] Field of Search ............ 310/42, 216, 217, 218, 310/254, 256, 258, 259

[56] References Cited
UNITED STATES PATENTS

| | | | |
|---|---|---|---|
| 794,998 | 7/1905 | Mott | 310/216 X |
| 1,255,606 | 2/1918 | Hensley | 310/216 X |
| 1,255,607 | 2/1918 | Hensely | 310/217 X |
| 2,913,603 | 11/1959 | Carlson | 310/218 X |
| 3,064,147 | 11/1962 | Porter et al. | 310/218 X |
| 3,339,132 | 8/1967 | Schafft | 310/216 X |
| 3,591,819 | 7/1971 | Laing | 310/217 |

Primary Examiner—Mark O. Budd
Attorney, Agent, or Firm—Joseph E. Papin

[57] ABSTRACT

A stator core structure for a dynamoelectric machine has a filament of ferro-magnetic material generally spirally disposed in at least one generally planar layer. A plurality of spaced apart teeth is provided in the layer each being respectively constituted by a plurality of generally contiguous open loop portions of the filament, one of the loop portions in each of the teeth having an end defining at least in part a bore in the stator core structure. A plurality of connecting portions of the filament are respectively joined between the loop portions.

A method of manufacturing a stator core structure for a dynamoelectric machine is also disclosed.

18 Claims, 5 Drawing Figures

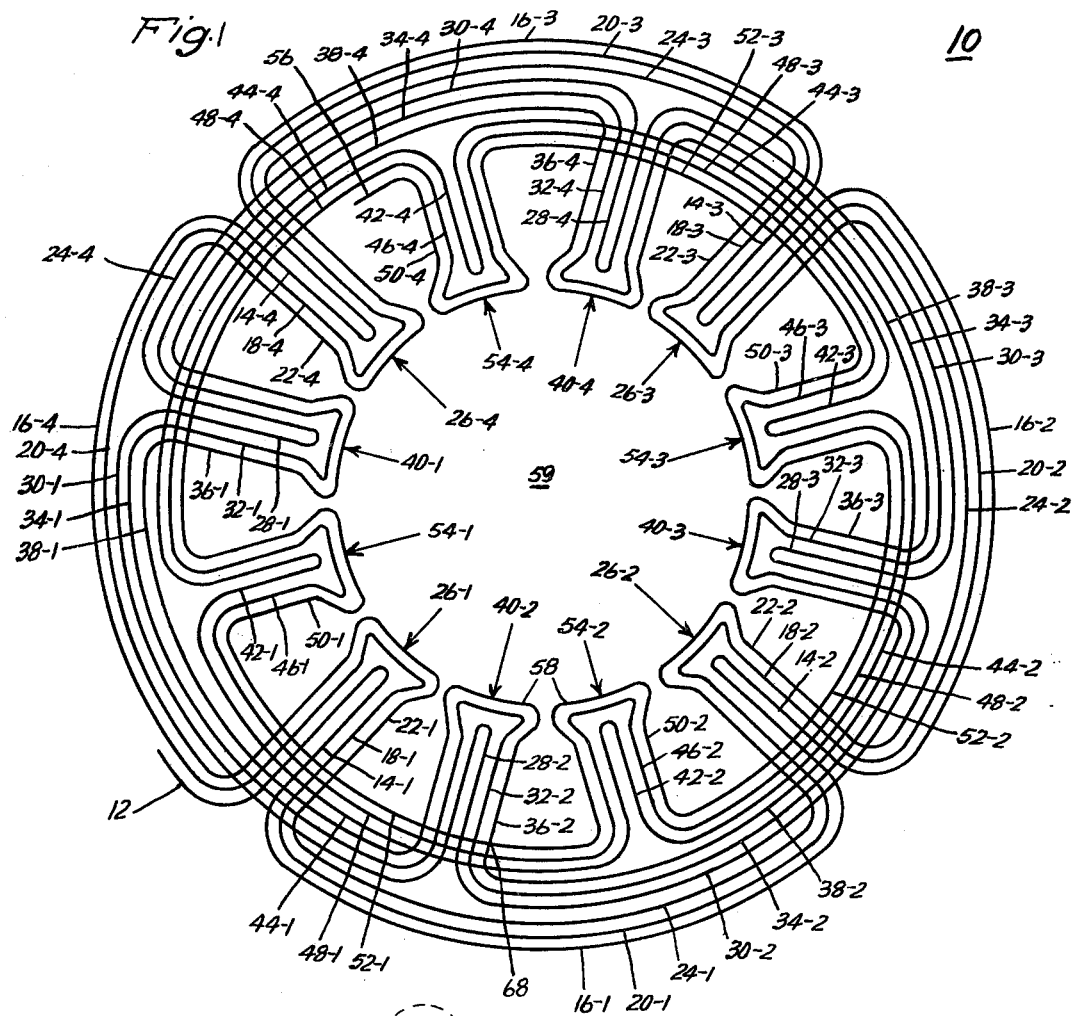
Fig.1
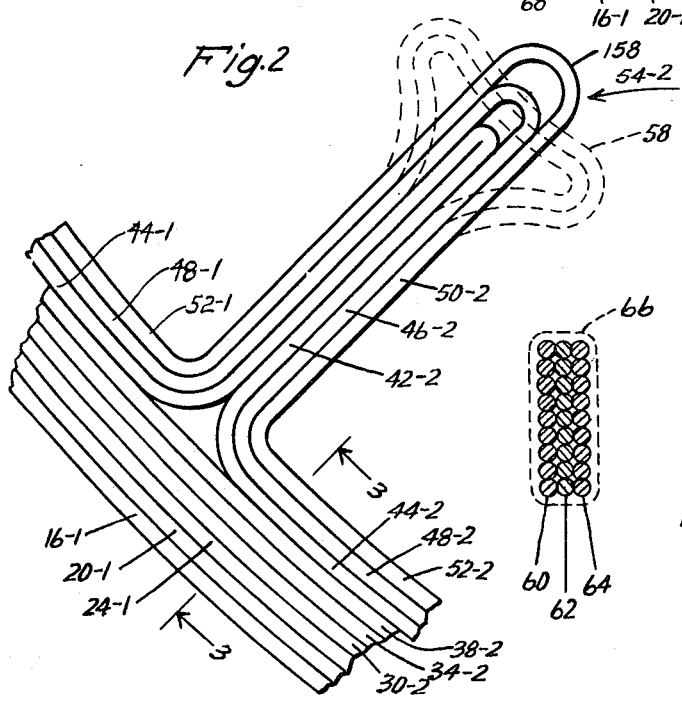
Fig.2
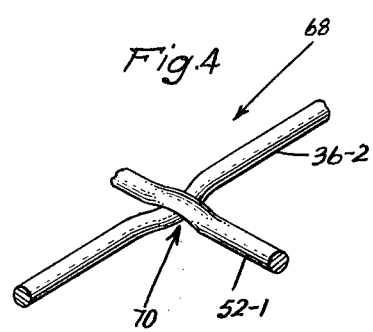
Fig.4
Fig.3

WIRE STATOR CORE STRUCTURE AND METHOD OF MAKING SAME

CROSS-REFERENCE TO RELATED APPLICATIONS

A related application is Ser. No. 521,047 filed Nov. 5, 1974 of Allen A. Brammerlo which is assigned to the assignee of the present application. Also my applications Ser. No. 521,046 and Ser. No. 521,044 filed Nov. 5, 1974, respectively are related applications and are assigned to the assignee of the present application. The disclosures of all of these related applications are incorporated herein by reference.

BACKGROUND OF THE INVENTION

This invention relates generally to dynamoelectric machines and more particularly to a stator core structure therefor and to methods of manufacturing a stator core structure.

In the past stator core structure for a dynamoelectric machine were conventionally formed of a stacked plurality of relatively thin laminations of sheet magnetic steel and the core had a central bore for receiving a rotor member. Such laminations are conventionally formed in a punch press operation from a strip of low carbon iron or magnetic steel, and there was considerable scrap remaining as the result of punching the laminations from the strip and punching the winding slots therefrom.

It has been proposed to form simple magnetic structures of transformers and electromagnets from a filament of iron wire or the like, but not stator core structures. It has also been proposed to form the pole pieces of a magneto stator core structure from a plurality of iron wires which are brazed together. However, such a construction involves holding and brazing the wires and in addition does not provide for manufacturing the yoke from iron wire.

It is accordingly an object of the invention to provide an improved dynamoelectric machine stator core structure.

Another object of the invention is to provide an improved, scrapless dynamoelectric machine stator core structure and a method for making such a stator core structure.

A further object of the invention is to provide an improved dynamoelectric machine having a stator core structure formed of ferro-magnetic wire and a method of making the same.

SUMMARY OF THE INVENTION

In carrying out the above and other objects in one form of the invention, I provide an improved stator core structure for a dynamoelectric machine formed of at least one elongate, continuous member of ferro-magnetic material having a plurality of spaces apart open loop portions formed therein respectively joined by connecting portions, the connecting portions generally establishing a first peripheral structure and the loop portions forming discrete areas extending from the first peripheral structure. In preferred embodiments, the continuous member is a filament.

Preferred methods of manufacturing that embody my invention result in multiple savings. For example, large punches and dies would no longer be needed as in the construction of conventional laminated stators, and there would be no longer need to periodically maintain and replace such dies. In addition, there is no waste ferro-magnetic material as in more conventional punched lamination approaches.

In general, a stator core structure in one form of the invention for a dynamoelectric machine has a filament of ferromagnetic material generally spirally disposed in at least one generally planar layer. A plurality of spaced apart teeth in the layer are each respectively constituted by a plurality of generally contiguous open loop portions of the filament. One of the loop portions in each of the teeth has an end defining at least in part a bore in the stator core structure. A plurality of connecting portions of the filament are respectively joined between the loop portions.

Also in general and in one form of the invention, a stator core structure for a dynamoelectric machine has a filament of ferro-magnetic material wound into at least first and second adjacent and generally planar layers. The first and second layers include a plurality of first and second teeth respectively constituted by a plurality of generally adjacent open loop portions of the filament and also a plurality of first and second connecting portions of the filament respectively joined between the loop portions of the first and second teeth. The second teeth are disposed generally between the first teeth so that adjacent ones of the first and second teeth define discrete polar areas in the stator core structure. One of the loop portions of each of the first and second teeth has an end which defines at least in part a bore within the stator core structure.

More particularly but also in general, a stator core structure in one form of the invention for a dynamoelectric machine has a filament of ferro-magnetic material wound into at least first and second generally contiguous layers respectively disposed in first and second planes extending generally normal to an axis of the stator core structure. The first layer has a plurality of spaced apart first teeth generally constituted by a plurality of adjacent concentrically disposed first open loop portions of the filament. A plurality of first connecting portions of the filament is also included in the first layer and respectively joined between the first open loop portions. The first connecting portions generally define a peripheral portion of the stator core structure, and the first loop portions extend generally radially inwardly from the first connecting portions toward the axis of the stator core structure. One of the first loop portions of each of the first teeth have a generally arcuate shaped end defining at least in part a generally cylindrical bore coaxial with the axis of the stator core structure. The second layer includes a plurality of spaced apart second teeth equal in number to the first teeth and respectively interposed between adjacent ones of the first teeth, and the second teeth are generally constituted by a plurality of adjacent concentrically disposed second open loop portions of the filament. A plurality of second connecting portions of the filament are also included in the second layer and are respectively joined between the second loop portions. The second loop portions extend generally radially inwardly from the second connecting portions toward the axis of the stator core structure, and one of the second loop portions of each of the second teeth also has a generally arcuate shaped end defining at least in part the bore of the stator core structure. The second connecting portions are disposed generally adjacent the first connecting portions so as to cross over respective ones of the first loop portions.

Further in general, a stator core structure in one form of the invention for a dynamoelectric machine has a continuous filament of ferro-magnetic material formed into a pattern including a predetermined number of radially extending open loops of the filament, the open loops form teeth so as to generally constitute a bore in the stator core structure, and a plurality of connecting portions of the filament joining between each of the loops and providing a magnetic flux path from one of the teeth to another thereof.

Still further and yet in general, a stator core structure in one form of the invention for a dynamoelectric machine has a filament of ferro-magnetic material generally spirally wound into a layer. The layer includes a predetermined number of open loop portions of the filament extending generally radially inwardly of the stator core structure and constituting pole teeth thereof, and a plurality of connecting portions of the filament respectively joining between adjacent ones of the loop portions are also included in the layer. The connecting portions provide a relatively low reluctance path for magnetic flux in opposite circumferential directions from one pole tooth to a corresponding pole tooth about the stator core structure.

The above-mentioned and other features and objects of this invention and the manner of attaining them will become more apparent and the invention itself will be better understood by reference to the following description of an embodiment of the invention taken in conjunction with the accompanying drawings.

BRIEF DESCRIPTION OF THE DRAWINGS

FIG. 1 is a schematic view showing a stator core structure in accordance with one form of the invention and teaching principles of a method of manufacturing a stator core structure also in one form of the invention;

FIG. 2 is a fragmentary view further showing the construction of the stator core member of FIG. 1;

FIG. 3 is a cross-sectional view taken along the line 3—3 of FIG. 2 (and reoriented 90°);

FIG. 4 is a fragmentary view showing a detail of the construction of the stator core structure of FIG. 1.

Corresponding reference characters indicate corresponding parts throughout the several views of the drawings.

Figure 5:
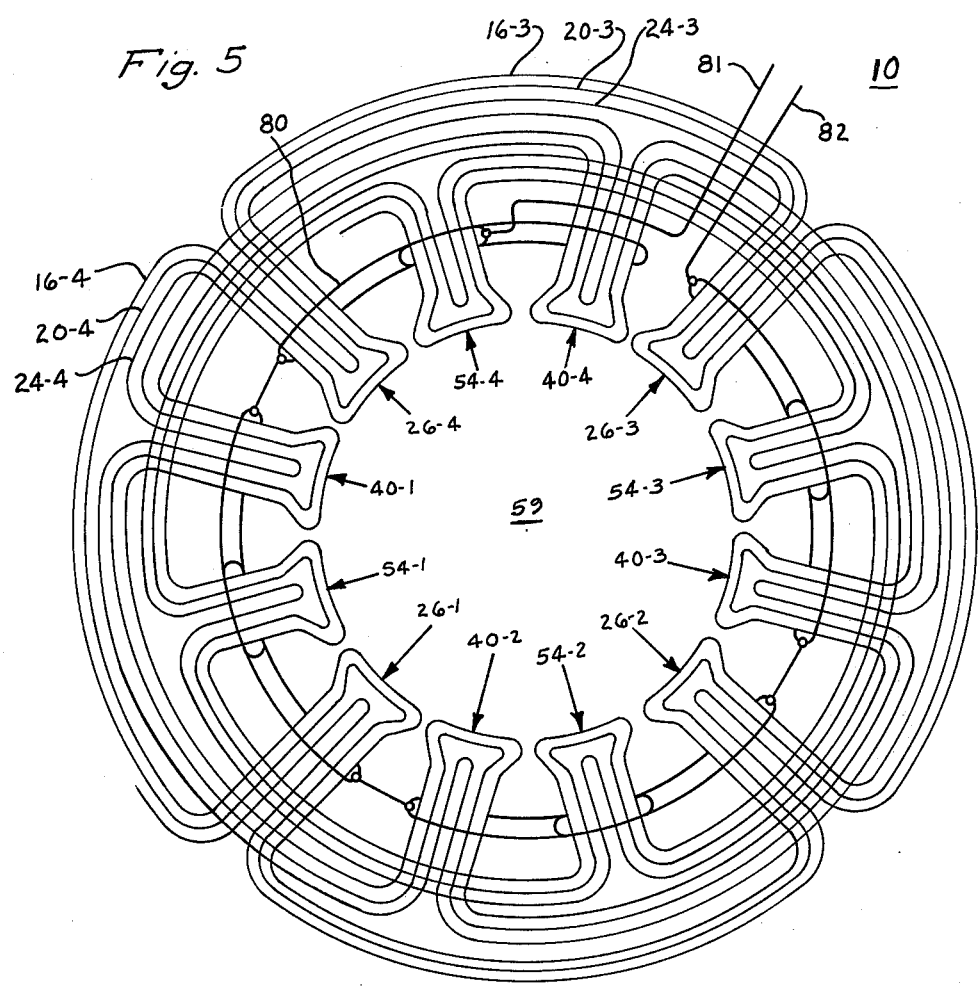
FIG. 5 is a schematic view similar to FIG. 1 showing an excitation winding on the stator core structure.

The exemplifications set out herein illustrate the preferred embodiments of the invention in one form thereof, and such exemplifications are not to be construed as limiting in any manner.

DESCRIPTION OF THE PREFERRED EMBODIMENT

Referring to FIG. 1 of the drawing, there is schematically shown a dynamoelectric machine stator core member, generally indicated at 10, formed of a continuous length of iron wire or filament of ferro-magnetic material 12. Wire 12 is formed, by wire bending apparatus (not shown), into a plurality of elongate, radially inwardly extending, generally open loop portions 14—1, 14—2, 14—3 and 14—4 respectively joined by a plurality of integral connecting portions 16—1, 16—2 and 16—3 which form part of a first peripheral structure that is illustrated in the general form of a circle. As used herein, the term "open loop" is a descriptive term that is intended to be inclusive of the geometric configuration of an elongate member that is curved or folded but does not cross itself. Open loop portions 14—1, 14—2, 14—3 and 14—4 illustrate the meaning intended by open loop. Loop portion 14—4 is joined by connecting portion 16—4 to another loop portion 18—1. Of course, the connecting portions of filament 12 in one layer may cross over the loop portions in another layer, as discussed in detail hereinafter, but the filament forming the loop portions does not cross itself within the respective loop portions.

Loop portions 18—1, 18—2, 18—3 and 18—4 respectively surround loop portions 14—1, 14—2, 14—3 and 14—4, and are respectively joined by connecting portions 20—1, 20—2, 20—3. Loop portion 18—4 is joined by connecting portion 20—4 to another loop portion 22—1.

Loop portions 22—1, 22—2, 22—3 and 22—4 respectively surround loop portions 18—1, 18—2, 18—3 an 18—4 and are respectively joined by connecting portions 24—1, 24—2 and 24—3. It will be observed that connecting portions 16, 20, and 24 form yoke portions of core 10 while loop portions 14, 18 and 22 form discrete areas or teeth 26—1, 26—2, 26—3 and 26—4. These aforementioned loop portions and their respective connecting portions form a first pattern.

Loop portion 22—4 of tooth 26—4 is joined by connecting portion 24—4 to a radially inwardly extending, open loop portion 28—1. Loop portions 28—1, 28—2, 28—3 and 28—4 (all still formed of the same continuous length of wire 12) are respectively joined by connecting portions 30—1, 30—2 and 30—3. Loop portion 28—4 is joined by connecting portion 30—4 to another loop portion 32—1.

Loop portions 32—1, 32—2, 32—3, and 32—4 respectively surround loop portion 28—1, 28—2, 28—3 and 28—4, and are respectively joined by connecting portions 34—1, 34—2 and 34—3. Loop portion 32—4 is joined by connecting portion 34—4 to another loop portion 36—1.

Loop portions 36—1, 36—2, 36—3 and 36—4 respectively surround loop portions 32—1, 32—2, 32—3 and 32—4 and are respectively joined by loop portions 38—1, 38—2, and 38—3. It will be seen that loop portions 28—1, 32—1 and 36—1; 28—2, 32—2 and 36—2; 28—3, 32—3 and 36—3; and 28—4, 32—4 and 36—4 respectively form another pattern and also teeth 40—1, 40—2, 40—3 and 40—4, respectively, intermediate teeth 26—4 and 26—1, 26—1 and 26—2, 26—2 and 26—3, and 26—4.

Loop portion 36—4 of tooth 40—4 is joined by connecting portion 38—4 to another loop portion 42—1. Loop portions 42—1, 42—2 and 42—3 are respectively joined by connecting portions 44—1, 44—2, and 44—3. Loop portion 42—4 is joined by connecting portion 44—4 to another loop portion 46—1.

Loop portions 46—1, 46—2, 46—3 and 46—4 respectively surround loop portions 42—1, 42—2, 42—3 and 42—4 and are respectively connected by connection portions 48—1, 48—2 and 48—3. Loop portion 46—4 is joined by connecting portion 48—4 to another loop portion 50—1.

Loop portions 50—1, 50—2, 50—3 and 50—4 respectively surround loop portions 46—1, 46—2, 46—3 and 46—4 and are respectively joined by connecting portions 52—1, 52—2 and 52—3. It will be seen that loop portions 42—1, 46—1 and 50—1; 42—2, 46—2 and 50—2; 42—3, 46—3 and 50—3; and 42—4, 46—4 and 50—4 form still another pattern and respectively form teeth 54—1, 54—2, 54—3 and 54—4. These teeth, respectively, are intermediate the pairs of teeth 40—1 and 26—1, 40—2 and 26—2, 40—3 and 26—3, and 40—4 and 26—4. Thus, the connecting portions and loop portions collectively form one generally planar layer or lamination 60 (better illustrated in FIG. 3) of a twelve toothed stator core structure. End 56 of loop portion 50—4 is joined to the next similarly formed layer of that stator core structure 10.

Additional layers such as layers 62, 64 as well as others for instance, can be formed to provide the desired stator core height. After a layer such as layer 60 for instance, is formed, it may be pressed or otherwise worked to reduce the thickness at cross-over points of material 12 therein as discussed in the description of FIG. 4. Alternatively, the pressing or other material thickness reducing operation may be performed on a plurality of layers. The ferro-magnetic material 12 could be impregnated with a bonding substance (not shown) so that when a layer 60 is pressed the ferro-magnetic material would be bonded together. Alternatively, bonding could be delayed until after a winding is in place on stator core 10, as discussed hereinafter.

Once a desired stator core height or axial length is obtained, a sizing tool (not shown) may be inserted between adjacent loop portions to size the space between such loop portions, and a plurality of ends 58 of the loop portions are then formed, as discussed hereinafter thereby defining a cylindrical bore 59. The loop portion ends 48 can be formed prior to excitation windings 80 being placed on the teeth, or alternatively, the ends can be formed after excitation windings are on the teeth, as described hereinafter.

It will be recognized that for ease of illustration and description, the various loop and connecting portions of the continuous length of wire 12 are schematically shown in FIG. 1 as being spaced from each other. However, and with reference to FIG. 2, it will be understood that in practical embodiments of the invention (when in a form corresponding to that represented by FIG. 1), the connecting portions 16, 20, 24, 30, 34, 38, 44, 48, 52 may be generally in abutting or contiguous relationships. Likewise, the loop portions of each tooth can be generally in abutting or contiguous relationship. Each of the teeth formed by the loop portions may be formed initially as shown in solid lines in FIG. 2 with the ends of the respective loop portions having circular ends 158. After excitation coils 80 (shown in FIG. 5) are placed on teeth 26, 40, and 54; ends 158 are formed or upset in a suitable fixture (not shown) to form arcuate pole face or tip portions 58 (shown in phantom) which define cylindrical bore 59 for receiving a rotor member (not shown).

Referring additionally to FIG. 3, the continuous length of wire 12 may be formed in a succession of patterns, as shown in FIG. 1, to form a plurality of abutting or contiguous generally planar layers or groups 60, 62, 64, etc., thereby to provide the desired axial length for stator core structure 10. Although iron wire 12 is illustrated as generally circular in cross-section, it will be understood that the wire may be filament ferro-magnetic material of square, rectangular, or any other suitable configuration. The particular configuration utilized may be determined by cost and space compaction considerations.

As many planar layers such as those indicated at 60, 62, 64 in FIG. 3, as necessary could be used to provide a desired stator core height or axial length. Any size of filament ferro-magnetic material 12 can be used keeping in mind core losses. Larger sizes of material 12 would, of course, have higher eddy current losses, while smaller sizes thereof would require more layers such as those indicated at 60, 62, 64, and, of course, offer less mechanical rigidity than the aforementioned larger size. A suitable size of iron-wire 12 may be one having a diameter of generally 0.040 to about 0.050 inches. It will be recognized that a complete stator core 10 can be made from one continuous length of ferromagnetic material 12 or alternatively each planar layer such as those indicated at 60, 62, 64 can be a separate length of the material. Additionally, instead of using just one strand of material 12 to form a generally planar layer 60, multiple strands may be used.

It will be understood that stator core structure 10 may be held in assembled relation at a plurality of locations by suitable non-conductive bands or straps, as indicated in dashed lines at 66 in FIG. 3, or alternatively may be held in assembled relation by excitation coils or windings 80 on teeth 26, 40, and 54.

Inspection of FIG. 1 will reveal that a number of the connecting portions of wire 12 cross over loop portion, as indicated at 68 in FIG. 1. Referring additionally to FIG. 4, wire 12 at such cross-over points 68 is preferably pressed, formed or otherwise reduce to a thickness generally equivalent to that of one diameter of wire 12, as illustrated at 70.

FIG. 5 shows stator core structure 10 having excitation windings or coils 80 disposed generally around teeth 26, 40, and 54. Windings 80 have unconnected winding ends 81 and 82. Tip portions 58 (see FIG. 2) can be formed to be close enough together to hold windings 80 in place and thereby eliminate the need for slot wedges. This would also allow for compaction of windings 80 giving better space factor. Forming tip portions 58 to hold windings 80 in place also creates a greater air gap flux area per tooth thus increasing performances. Thus, the greater flux area can allow a greater air gap between the teeth and the rotor (not shown) thereby reducing tight machining tolerances that otherwise may be required between stator and rotor.

It will now be seen that the entire stator core structure 10 can be formed from at least one continuous unbroken strand of wire 12 thus eliminating scrap. It will further be seen that stator 10 so constructed provides the desirable feature of having the proper direction of the magnetic path for all flux. For example, a low reluctance flux path is provided from one tooth to another through connecting portions linking those two teeth. In FIG. 1, the flux path from tooth 40—3 for instance, would follow connecting portions 38—2, 34—2, and 30—2 in a clockwise direction to tooth 40—2 then through the air gap and rotor (not shown) back to tooth 40—3. In a counterclockwise direction from tooth 40—3, the flux path would follow connecting portions 30—3, 34—3, and 38—3 to tooth 40—4 then through the air gap and rotor (not shown) and back to tooth 40—3. It will be recognized that the flux flows in both directions around stator core 10 by following paths of least reluctance. The flux can flow from one tooth to another by following one connecting portion and does not have to cross from one connecting portion to a different connecting portion. Even though the connecting portions are in abutting relationship with each other, there may be a greater reluctance path from one connecting portion to another as compared to a reluctance path continuing on a given connecting portion.

At one instant in time, an exciting current, applied to winding ends 81 and 82 of FIG. 5, could cause teeth 26—4, 54—4, and 40—4 to form a magnetic south pole with the center located substantially along tooth 54—4. Teeth 26—3, 54—3, and 40—3 would then become a magnetic north pole along with teeth 26—1, 54—1, and 40—1 forming a separate magnetic north pole; while teeth 26—2, 54—2 and 40—2 would form a magnetic south pole. This arrangement represents a four pole dynamoelectric machine stator. Magnetic flux would flow counterclockwise from tooth 26—4 along common connecting portion 24—4 to tooth 40—1, then through the air gap and rotor (not shown) back to tooth 26—4. Also flowing counterclockwise would be flux following connecting portions 16—4 and 20—4 from tooth 26—4 to tooth 26—1 then through the air gap and rotor back to tooth 26—4. Flux flows clockwise from tooth 26—4 via connecting portions 16—3, 20—3, and 24—3 to tooth 26—3 then through the air gap and rotor (not shown) back to tooth 26—4. It will be understood that magnetic flux flows (at given instants of time) in a similar fashion between the other teeth. The flux from a tooth of one instantaneous magnetic polarity flows to a tooth of an opposite instantaneous magnetic polarity by always following common connecting portions.

It should now be understood that I have provided a novel method of fabricating or manufacturing a dynamoelectric machine magnetic core such as that indicated at 10 for instance, that includes establishing a number of continuous low reluctance magnetic flux path patterns by forming at least one continuous length of filament magnetic material in a manner that establishes a number of spaced apart winding accommodating members or teeth that are interconnected, by low reluctance connecting portions, in predetermined patterns. A preferred method further includes disposing winding means that comprises at least two coil groups (each having one or more coils of one or more winding turns) about selected ones of the teeth in a predetermined manner than can establish instantaneous magnetic poles of opposite polarity and so that flux established instantaneously by the at least two coil groups during energization of the winding means will flow along low reluctance connecting portions from a tooth having a coil of the first coil group adjacent thereto to a tooth having a coil of the second coil group adjacent thereto. In other words I have provided a method wherein I form patterns of teeth and connecting portions that establish low reluctance flux paths in a magnetic core so that the flux from a tooth having one instantaneous polarity flows to a tooth having an opposite instantaneous polarity along connecting portions that connect these two teeth.

In establishing the number of layers required to produce a stator core 10 having a height of three and a half inches for instance, the filament thickness may be divided into stator height. If a 0.050 inch thick filament 12 was being utilized in such stator core 10, seventy layers would be required to obtain the desired height of three and a half inches. If each layer has Y number of patterns and each pattern has X number of teeth then the total number of teeth per layer is Y multiplied by X. The teeth in each pattern are interconnected by an unbroken low reluctance flux path with the adjacent teeth in the same pattern.

While there have been described above the principles of this invention in connection with specific apparatus, it is to be clearly understood that this description is made only by way of example and not as a limitation to the scope of the invention.

What I claim as new and desire to secure by Letters Patent of the United States of America is:

1. A stator core structure for a dynamo-electric machine comprising a filament of ferro-magnetic material generally spirally disposed in at least one generally planar layer and including a plurality of spaced apart teeth in the layer each respectively constituted by a plurality of generally contiguous open loop portions of the filament, one of the loop portions in each of the teeth having an end defining at least in part a bore in the stator core structure, and a plurality of connecting portions of the filament respectively joined between the loop portions.

2. The stator core structure of claim 1 wherein the filament is iron wire.

3. The stator core structure of claim 1 wherein the loop portions extend generally radially inwardly from the connecting portions toward the bore.

4. The stator core structure of claim 1 wherein each of the ends is constituted by an arcuate tip section so as to form the at least portion of the bore.

5. The stator core structure according to claim 1, wherein the connecting portions of the filament define at least in part an outer peripheral portion of the stator core structure.

6. The stator core structure according to claim 1, further comprising a plurality of windings respectively encircling each of the teeth in the stator core structure.

7. A stator core structure for a dynamoelectric machine comprising a filament of ferro-magnetic material wound into at least first and second adjacent and generally planar layers, the first and second layers including a plurality of first and second teeth respectively constituted by a plurality of generally adjacent open loop portions of the filaments and a plurality of first and second connecting portions of the filament respectively joined between the loop portions of the first and second teeth, the second teeth being disposed generally between the first teeth so that adjacent ones of the first and second teeth define discrete polar areas in the stator core structure, and one of the loop portions of each of the first and second teeth having an end which defines at least in part a bore within the stator core structure.

8. A stator core structure as set forth in claim 7, wherein the loop portions of the first and second teeth are generally equal in number, each of the loop portions of the second teeth extending radially inwardly from the second connecting portions between the loop portions of adjacent ones of the first teeth toward the bore, and the second connecting portions being generally contiguous to the first connecting portions.

9. A stator core structure as set forth in claim 7, wherein one of the first and second connecting portions include parts which cross over the loop portions of one of the first and second teeth.

10. A stator core structure as set forth in claim 7, wherein one of the first and second connecting portions generally define at least in part an outer peripheral portion of the stator core structure.

11. A stator core structure as set forth in claim 7, wherein the filament is constituted by an iron wire.

12. A stator core structure as set forth in claim 7, wherein the loop portions of the first and second teeth extend generally radially inwardly toward the bore.

13. A stator core structure as set forth in claim 7, wherein each of the ends of the first and second teeth is constituted by a generally arcuate tip section so as to form the at least portion of the bore.

14. A stator core structure as set forth in claim 7, wherein the loop portions of the first and second teeth are generally similar and equal in number.

15. A stator core structure as set forth in claim 7, wherein the first and second patterns are disposed in adjacent generally parallel planes in the stator core structure.

16. A stator core structure as set forth in claim 7, wherein the loop portions of the first and second teeth and the first and second connecting portions in the first and second layers lie in adjacent generally parallel first and second planes and are generally contiguous, respectively.

17. A stator core structure for a dynamoelectric machine comprising a filament of ferro-magnetic material generally spirally formed into a layer including a predetermined number of open loop portions of the filament extending generally radially inwardly of the stator core structure and constituting pole teeth thereof, and a plurality of connecting portions of the filament respectively joining between adjacent ones of the loop portions, the connecting portions providing a relatively low reluctance path for magnetic flux in opposite circumferential directions from one pole tooth to a corresponding opposite pole tooth completely about the stator core structure.

18. A stator core structure for a dynamoelectric machine comprising a filament of ferro-magnetic material wound into at least first and second generally contiguous layers respectively disposed in first and second planes extending generally normal to an axis of the stator core structure, the first layer including a plurality of spaced apart first teeth generally constituted by a plurality of adjacent concentrically disposed first open loop portions of the filament, and a plurality of first connecting portions of the filament respectively joined between the first open loop portions, the first connecting portions generally defining a peripheral portion of the stator core structure and the first loop portions extending generally radially inwardly from the first connecting portions toward the axis of the stator core structure, one of the first loop portions of each of the first teeth having a generally arcuate shaped end defining at least in part a generally cylindrical bore coaxial with the axis of the stator core structure, the second layer including a plurality of spaced apart second teeth equal in number to the first teeth and respectively interposed between adjacent ones of the first teeth, the second teeth being generally constituted by a plurality of adjacent concentrically disposed second open loop portions of the filament, and a plurality of second connecting portions of the filament respectively joined between the second loop portions, the second loop portions extending generally radially inwardly from the second connecting portions toward the axis of the stator core structure, one of the second loop portions of each of the second teeth having a generally arcuate shaped end defining at least in part the bore of the stator core structure, and the second connecting portions being disposed generally adjacent the first connecting portions so as to cross over respective ones of the first loop portions.

\* \* \* \* \*

UNITED STATES PATENT OFFICE
CERTIFICATE OF CORRECTION

PATENT NO. : 3,983,433
DATED : September 28, 1976
INVENTOR(S) : Marion W. Sims

It is certified that error appears in the above-identified patent and that said Letters Patent are hereby corrected as shown below:

Col. 1, line 11, after "respectively" insert --,--;
       line 21, after "past" insert --,--;
       line 21, delete "structure" and insert --structures--;
       line 24, after "steel" insert --,--;
       line 57, delete "spaces" and insert --spaced--.
Col. 2, line 6, delete "ferromagnetic" and insert --ferro-magnetic--.

Col. 4, line 1, delete "Open loop" and insert --"Open loop"--;
       line 3, delete "open loop" and insert --"open loop"--.
Col. 5, line 9, after "layers", first occurrence, insert --,--.
       line 11, after "layer" insert --,--;
       line 14, after "therein" insert --,--;
       line 28, after "after" insert --,--;
       line 41, after "be" insert --arranged--;
       line 43, before "generally" insert --arranged--;
       line 65, after "layers" insert --,--.
Col. 6, line 2, delete "," (third occurrence);
       line 3, after "layers" insert --,--;
       line 7, after "generally" insert --about--;
       line 10, after "12" insert --,--;
       line 10, after "layer" insert --,--;
       line 11, after "64" insert --,--;
       line 22, delete "portion" and insert --portions--;
       line 39, delete "formances" and insert --formance--;
       line 52, after "40—3" insert --,--.
Col. 7, line 31, after "core" insert --,--.
Col. 8, line 8, delete "dynamo-electric" and insert --dynamoelectric--.

Signed and Sealed this

Fifth Day of April 1977

[SEAL]

Attest:

RUTH C. MASON
Attesting Officer

C. MARSHALL DANN
Commissioner of Patents and Trademarks